United States Patent
Ellis et al.

(10) Patent No.: US 9,582,211 B2
(45) Date of Patent: Feb. 28, 2017

(54) THROTTLING COMMAND EXECUTION IN NON-VOLATILE MEMORY SYSTEMS BASED ON POWER USAGE

(71) Applicant: SanDisk Enterprise IP LLC, Milpitas, CA (US)

(72) Inventors: Robert W. Ellis, Phoenix, AZ (US); James M. Higgins, Chandler, AZ (US); Mark Dancho, Chandler, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/572,619

(22) Filed: Dec. 16, 2014

(65) Prior Publication Data

US 2015/0309751 A1    Oct. 29, 2015

Related U.S. Application Data

(60) Provisional application No. 61/985,923, filed on Apr. 29, 2014.

(51) Int. Cl.
     *G06F 12/02*      (2006.01)
     *G06F 3/06*      (2006.01)
     *G06F 1/32*      (2006.01)

(52) U.S. Cl.
     CPC ............ *G06F 3/0625* (2013.01); *G06F 1/329* (2013.01); *G06F 1/3225* (2013.01);
(Continued)

(58) Field of Classification Search
CPC .... G06F 3/0659; G06F 3/0679; G06F 3/0625; G06F 3/0688; G06F 3/0634;
(Continued)

(56) References Cited

U.S. PATENT DOCUMENTS 8,725,931 B1 * 5/2014 Kang .................. G06F 13/1642
                                                                       710/52
8,751,836 B1 * 6/2014 Piszczek ............... G06F 1/3268
                                                                       713/300

(Continued)

FOREIGN PATENT DOCUMENTS

| EP | 0 878 755 A1 | 11/1998 |
| EP | 2 602 707 A2 | 6/2013 |
| WO | WO 2010/116349 | 10/2010 |

OTHER PUBLICATIONS

Internation Search Report and Written Opinion dated Jul. 14, 2015, received in International Patent Application No. PCT/US2015/027265, which corresponds to U.S. Appl. No. 14/572,619, 10 pages (Ellis).

(Continued)

*Primary Examiner* — Hiep Nguyen
(74) *Attorney, Agent, or Firm* — Morgan, Lewis & Bockius LLP

(57) ABSTRACT

A method of operation in a non-volatile memory system for deferring, in accordance with a determination to reduce power consumption by the non-volatile memory system, execution of commands in a command queue corresponding to a distinct set of non-volatile memory devices during a respective wait period. In some implementations, the respective wait period for a first distinct set of non-volatile memory devices in at least two distinct sets is at least partially non-overlapping with the respective wait period for a second distinct set of non-volatile memory devices in the at least two distinct sets.

21 Claims, 9 Drawing Sheets

(52) U.S. Cl.
CPC .......... *G06F 3/0634* (2013.01); *G06F 3/0659* (2013.01); *G06F 3/0679* (2013.01); *G06F 3/0688* (2013.01); *Y02B 60/1246* (2013.01); *Y02B 60/144* (2013.01)

(58) Field of Classification Search
CPC ..... G06F 1/329; G06F 1/3225; Y02B 60/144; Y02B 60/1246
See application file for complete search history.

(56) References Cited

U.S. PATENT DOCUMENTS

| | | | |
|---|---|---|---|
| 2001/0011319 A1 | 8/2001 | Beppu | |
| 2004/0267409 A1 | 12/2004 | De Lorenzo et al. | |
| 2005/0108491 A1* | 5/2005 | Wong | G11C 29/50004 711/167 |
| 2005/0204175 A1 | 9/2005 | Burton | |
| 2009/0171513 A1 | 7/2009 | Tsukazawa | |
| 2010/0049905 A1 | 2/2010 | Ouchi | |
| 2011/0122691 A1 | 5/2011 | Sprouse | |
| 2011/0191666 A1* | 8/2011 | Decker | G06F 3/14 715/234 |
| 2011/0239009 A1 | 9/2011 | Noda | |
| 2012/0023346 A1 | 1/2012 | Byom et al. | |
| 2012/0159057 A1 | 6/2012 | Loh et al. | |
| 2012/0290864 A1 | 11/2012 | Seroff | |
| 2012/0331207 A1 | 12/2012 | Lassa et al. | |
| 2012/0331282 A1* | 12/2012 | Yurzola | G06F 1/3275 713/100 |
| 2013/0080679 A1 | 3/2013 | Bert | |
| 2013/0275781 A1 | 10/2013 | Ramage et al. | |
| 2013/0305008 A1* | 11/2013 | Kwon | G06F 13/1689 711/167 |
| 2014/0304560 A1* | 10/2014 | Narasimha | G06F 11/0727 714/704 |
| 2015/0323976 A1* | 11/2015 | Chen | G06F 1/3293 713/323 |
| 2016/0062421 A1 | 3/2016 | Sugawara et al. | |

OTHER PUBLICATIONS

International Search Report and Written Opinion dated Dec. 15, 2015, received in International Patent Application No. PCT/US2015/053641, which corresponds to U.S. Appl. No. 14/668,710, 12 pages (Thangaraj).

International Search Report and Written Opinion dated Dec. 14, 2015, received in International Patent Application No. PCT/US2015/053644, which corresponds to U.S. Appl. No. 14/668,722, 12 pages (Thangaraj).

International Search Report and Written Opinion dated Feb. 11, 2016, received in International Patent Application No. PCT/US2015/053549 which corresponds to U.S. Appl. No. 14/572,633, 13 pages (Ellis).

\* cited by examiner

Command Deferral Module 214

500

In accordance with a determination to reduce power consumption by the non-volatile memory system, the non-volatile memory system including a plurality of distinct sets of non-volatile memory devices:

For each of at least two distinct sets of the plurality of distinct sets of non-volatile memory devices, defer execution of commands in a command queue corresponding to the distinct set of non-volatile memory devices during a respective wait period ⌐502

The respective wait period for a first distinct set of non-volatile memory devices in the at least two distinct sets is at least partially non-overlapping with the respective wait period for a second distinct set of non-volatile memory devices in the at least two distinct sets. ⌐504

Each of the plurality of distinct sets of non-volatile memory devices comprises a memory channel that includes a corresponding channel controller, and the command queue corresponding to the distinct set of non-volatile memory devices in the memory channel comprises a command queue for the memory channel ⌐506

A channel controller for a respective memory channel determines whether to defer execution of commands in the command queue for the respective memory channel in accordance with an external signal received by the channel controller. ⌐508

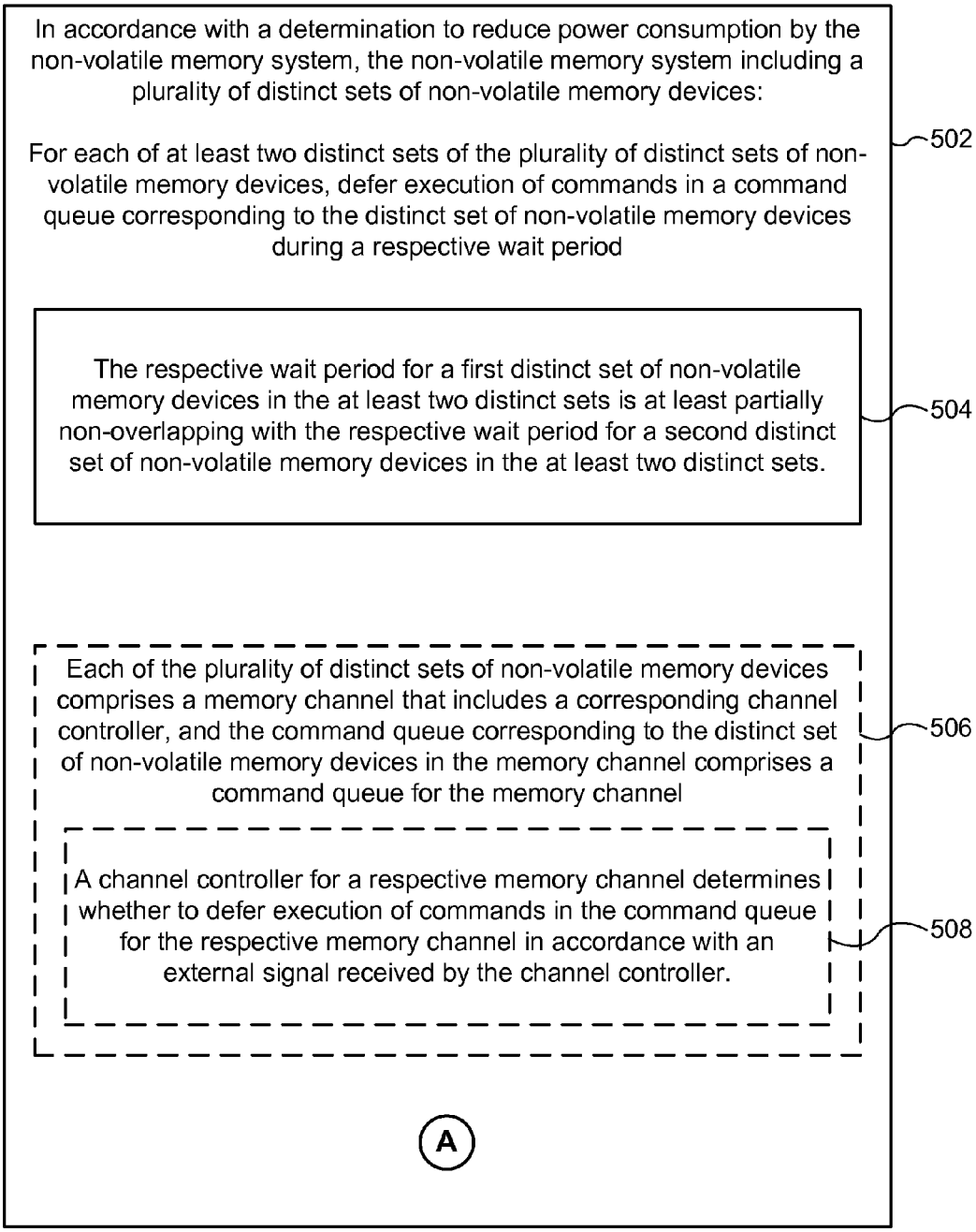

Figure 5A

502 — In accordance with a determination to reduce power consumption by the non-volatile memory system, the non-volatile memory system including a plurality of distinct sets of non-volatile memory devices:

For each of at least two distinct sets of the plurality of distinct sets of non-volatile memory devices, defer execution of commands in a command queue corresponding to the distinct set of non-volatile memory devices during a respective wait period (A)

510 — The non-volatile memory system includes M memory channels, where M is an integer greater than 1, each memory channel comprising a distinct set of non-volatile memory devices having a corresponding command queue and wait period 512 — The wait period for each memory channel of the M memory channels repeats in accordance with a duty cycle corresponding to a priority of the memory channel 514 — The wait period for each memory channel of the M memory channels has a duration based at least in part on a priority of the corresponding memory channel (B)

Figure 5B

THROTTLING COMMAND EXECUTION IN NON-VOLATILE MEMORY SYSTEMS BASED ON POWER USAGE

RELATED APPLICATIONS

This application claims priority to U.S. Provisional Application No. 61/985,923, filed Apr. 29, 2014, which is hereby incorporated by reference in its entirety.

TECHNICAL FIELD

The disclosed embodiments relate generally to storage controller systems, and in particular, to throttling command execution in storage systems based on power usage.

BACKGROUND

Semiconductor storage devices are commonly used for storing and managing data for electronic devices. A typical non-volatile data storage device stores data as an electrical value in the memory cells of flash memory, where flash memory controllers are generally tasked with managing data transactions across multiple memory channels of the storage.

Data transactions in data storage devices are generally carried out by executions of flash commands. To facilitate this process, flash memory controllers are often constructed with command queues that help optimize command executions across multiple memory channels. Commands executed in parallel across multiple memory channels, however, can result in spikes in power consumption.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to throttle command execution in non-volatile memory systems based on power usage. In one aspect, execution of commands in a command queue corresponding to a set of non-volatile memory devices is deferred in accordance with a determination to reduce power consumption.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 5A-5E illustrate a flowchart representation of a method of deferring execution of commands in a command queue, in accordance with some embodiments.

Figure 1:
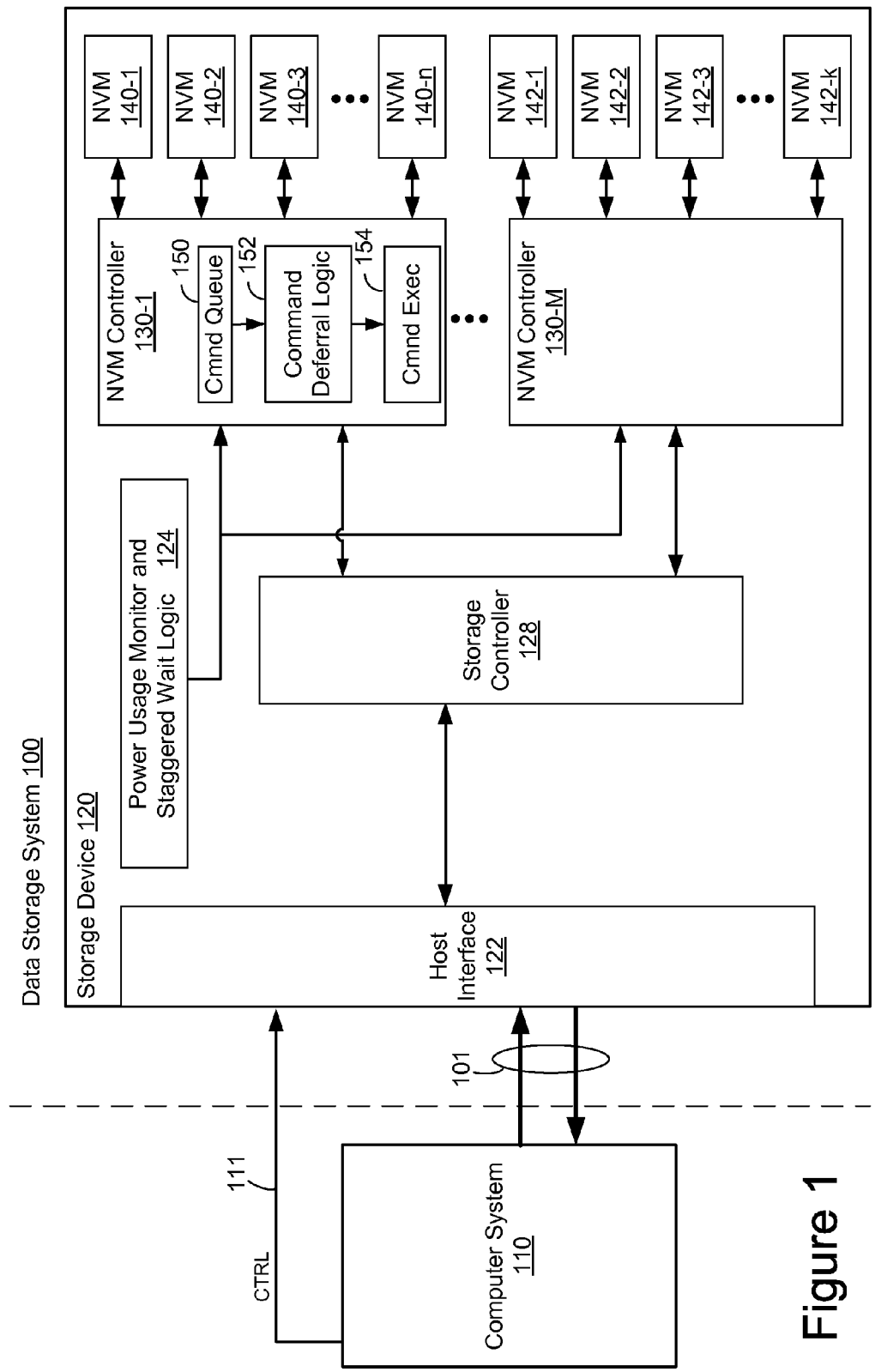
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable throttling of command execution in non-volatile memory systems based on power usage. Some implementations include systems, methods and/or devices to defer execution of commands in a command queue.

More specifically, some implementations include a method of operation in a non-volatile memory system, the non-volatile memory system including a plurality of distinct sets of non-volatile memory devices. The method further includes, in accordance with a determination to reduce power consumption by the non-volatile memory system, deferring execution of commands in a command queue corresponding to the distinct set of non-volatile memory devices during a respective wait period. In some implementations, the respective wait period for a first distinct set of non-volatile memory devices in the at least two distinct sets is at least partially non-overlapping with the respective wait period for a second distinct set of non-volatile memory devices in the at least two distinct sets.

In some embodiments, each of the plurality of distinct sets of non-volatile memory devices comprises a memory channel and a corresponding channel controller, and the command queue corresponding to the distinct set of non-volatile memory devices in the memory channel comprises a command queue for the memory channel.

In some embodiments, the channel controller for a respective memory channel determines whether to defer execution of commands in the command queue for the respective memory channel in accordance with an external signal received by the channel controller.

In some embodiments, the non-volatile memory system includes M memory channels, where M is an integer greater than 1, each memory channel comprising a distinct set of non-volatile memory devices having a corresponding command queue and wait period.

In some implementations, the wait period for each memory channel of the M memory channels repeats in accordance with a duty cycle corresponding to a priority of the memory channel.

In some implementations, the wait period for each memory channel of the M memory channels has a duration based at least in part on a priority of the corresponding memory channel.

In some embodiments, a power measurement corresponding to power consumption by a subsystem is obtained, wherein the subsystem includes the plurality of distinct sets of non-volatile memory devices. In some implementations, the power measurement is a measure of instantaneous power consumption by the subsystem. Furthermore, in some implementations, the power measurement is received from a device external to the non-volatile memory system. In some implementations, the power measurement is obtained in accordance with a power measurement frequency.

In some embodiments, the determination to reduce power consumption by the non-volatile memory system is made in accordance with the obtained power measurement and one or more power threshold values.

In some embodiments, execution of commands is restarted in command queues of M memory channels at M distinct staggered start times, where M is an integer greater than 1. Furthermore, in some implementations, the non-volatile memory system includes M memory channels, each memory channel comprising a distinct set of non-volatile memory devices having a corresponding command queue. In some implementations, each memory channel of the M memory channels further comprises a channel controller configured to receive an external signal and to defer execution of commands in the command queue corresponding to the memory channel in accordance with the external signal. In some implementations, each of the M distinct staggered start times corresponds to an end of a wait period for a corresponding memory channel, wherein the wait periods for the M memory channels have staggered end times corresponding to said M distinct start times.

Optionally, in some embodiments, for one or more of the distinct sets of non-volatile memory devices, the deferred execution of commands in the respective command queue is overridden. In some implementations, overriding the deferred execution of commands in the respective command queue is based at least in part on a priority of the corresponding distinct set of non-volatile memory devices. Furthermore, in some implementations, overriding the deferred execution of commands in the respective command queue is based at least in part on a priority of one or more of the commands in the respective command queue.

In another aspect, a memory system includes (a) a plurality of distinct sets of non-volatile memory devices; (b) an execution deferral means, for each of at least two distinct sets of the plurality of distinct sets of non-volatile memory devices, for deferring execution of commands in a command queue corresponding to the distinct set of non-volatile memory devices during a respective wait period; and (c) means for enabling the execution deferral means in accordance with a determination to reduce power consumption by the memory system, wherein the respective wait period for a first distinct set of non-volatile memory devices in the at least two distinct sets is at least partially non-overlapping with the respective wait period for a second distinct set of non-volatile memory devices in the at least two distinct sets.

In yet another aspect, a memory system includes (a) a plurality of distinct sets of non-volatile memory devices; (b) a plurality of channel controllers, each channel controller corresponding to a respective set of the plurality of distinct sets of non-volatile memory devices, each channel controller configured to defer execution of commands in a command queue corresponding to the distinct set of non-volatile memory devices during a respective wait period; and (c) an apparatus for determining the wait period for each of the plurality of distinct sets of non-volatile memory devices, wherein the respective wait period for a first distinct set of non-volatile memory devices in the at least two distinct sets is at least partially non-overlapping with the respective wait period for a second distinct set of non-volatile memory devices in the at least two distinct sets.

In yet another aspect, a non-transitory computer readable storage medium, storing one or more programs for execution by one or more processors of a storage device having a plurality of controllers, the one or more programs including instructions for performing any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120 (also sometimes called an information storage device, or a data storage device, or a memory device), which includes host interface 122, power usage monitor and staggered wait logic 124, storage controller 128, one or more non-volatile memory (NVM) controllers 130 such as flash controllers, and non-volatile memory (e.g., one or more NVM device(s) 140, 142 such as one or more flash memory devices), and is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, NVM controller 130 is a solid-state drive (SSD) controller. However, one or more other types of storage media may be included in accordance with aspects of a wide variety of implementations.

Computer system 110 is coupled to storage device 120 through data connections 101. However, in some implementations computer system 110 includes storage device 120 as a component and/or sub-system. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to storage device 120. In some implementations, computer system 110 is a server system, such as a server system in a data center, and does not have a display and other user interface components.

In some implementations, storage device 120 includes NVM devices 140, 142 such as flash memory devices (e.g., NVM devices 140-1 through 140-*n* and NVM devices 142-1 through 142-*k*) and NVM controllers 130 (e.g., NVM controllers 130-1 through 130-M). Viewed another way, storage device 120 includes M memory channels, each of which has an NVM controller 130 and a set of NVM devices 140 or 142 coupled to the NVM controller 130, where M is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16 or 32. In another non-limiting example, the number of NVM devices 140 or 142 per memory channel is typically 8, 16, 32 or 64. Furthermore, in some implementations, the number of NVM devices 140/142 is different in different memory channels.

In some implementations, each NVM controller 130 includes one or more processing units (also sometimes called CPUs or processors or microprocessors or microcontrollers) configured to execute instructions in one or more programs (e.g., stored in memory in the NVM controller 130). In some implementations, the one or more processors are shared by one or more components within, and in some cases, beyond the function of NVM controllers 130. NVM devices 140, 142 are coupled to NVM controllers 130 through connections that convey commands in addition to data, and optionally convey metadata, error correction information and/or other information in addition to data values to be stored in NVM devices 140, 142 and data values read from NVM devices 140, 142.

In some embodiments, storage device 120 is configured for enterprise storage suitable for applications such as cloud computing, or for caching data stored (or to be stored) in secondary storage, such as hard disk drives. In some other embodiments, storage device 120 is configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile storage controller(s).

Furthermore, in some implementations, NVM controllers 130 each include one or more command queues 150, command deferral logic 152, and a command executor 154.

In some implementations, command queue 150 in a respective NVM controller 130 is used to hold commands waiting for execution by a set of NVM devices 140 or 142 coupled to the respective NVM controller 130. A respective command queue 150, when not empty, contains one or more commands corresponding to read, write and/or erase operations for reading data from, writing data to, or erasing data from a corresponding set of NVM devices (e.g., NVM devices 140 or 142). In some implementations, commands in command queue 150 include host commands received from computer system 110. The combination of a set of NVM devices 140 (e.g., NVM devices 140-1 through 140-*n*), and a corresponding NVM controller 130 (e.g., NVM controller 130-1) is sometimes referred to as a memory channel (e.g., memory channel i, FIG. 2). Storage device 120 can include as many memory channels as there are distinct sets of NVM devices to which commands can be dispatched in parallel by a set of NVM controllers.

Command deferral logic 152 is coupled to command queue 150, and includes logic for determining whether to defer execution of commands in one or more command queues 150. In some implementations, command deferral logic 152 defers execution of commands in command queue 150 in accordance with the one or more external signals (e.g., Ch 1 Deferral Signal 308, FIG. 3A) received from power usage monitor and staggered wait logic 124. In some implementations, command deferral logic 152 in a respective memory channel is implemented by a set of instructions in one or more programs executed by the NVM controller 130 for that memory channel. 130-M In some implementations, in a respective memory channel, command executor 154 dispatches commands from command queue 150 to the NVM devices 140 or 142 in that memory channel, and command deferral logic 152 defers the dispatching of commands from the command queue 150 to the NVM devices 140 or 142 in the memory channel.

In some implementations, power usage monitor and staggered wait logic 124 is coupled to and provides one or more external signals (e.g., Ch 1 Deferral Signal 308, FIG. 3A) to NVM controllers 130. In some implementations, power usage monitor and staggered wait logic 124 includes circuitry (e.g., power monitor 310 and power threshold comparison module 312, FIG. 3A) for measuring and monitoring power consumption by storage device 120 or by a subsystem of storage device 120. In one example, the subsystem for which power is monitored includes all the memory channels of storage device 120 (e.g., all the NVM controllers 130 and all the NVM devices 140, 142 controlled by the NVM controllers), and in another example the subsystem for which power is monitored includes all the NVM devices 140, 142 in the memory channels of storage device 120, but not the NVM controllers 130, storage controller 128 and host interface 122. Various embodiments of power usage monitor and staggered wait logic 124 are described below with reference to FIGS. 3A and 3B.

In some implementations, command executor 154 is configured to defer and/or restart execution of commands in command queue 150. Deferring and/or restarting execution of commands, in some implementations, is in accordance with the output of command deferral logic 152.

In some implementations, storage device 120 also includes one or more of host interface 122, power usage monitor and staggered wait logic 124, and storage controller 128. Optionally, storage device 120 includes various additional features that have not been illustrated for the sake of brevity and so as not to obscure more pertinent features of the example implementations disclosed herein, and a different arrangement of features may be possible. Host interface 122 provides an interface to computer system 110 through data connections 101.

Storage controller 128 is coupled to host interface 122 and NVM controllers 130. In some implementations, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication, such as double data rate type three synchronous dynamic random access memory (DDR3). In some embodiments, storage controller 128 and NVM controllers 130 use a defined interface standard for communication, such as serial advance technology attachment (SATA). In some other implementations, the device interface used by storage controller 128 to communicate with NVM controllers 130 is SAS (serial attached SCSI), or other storage interface. In some implementations, storage controller 128 includes one or more processing units (also sometimes called CPUs or processors or microprocessors or microcontrollers) configured to execute instructions in one or more programs (e.g., in storage controller 128). In some implementations, the one or more processors are shared by one or more components within, and in some cases, beyond the function of storage controller 128.

Figure 2:
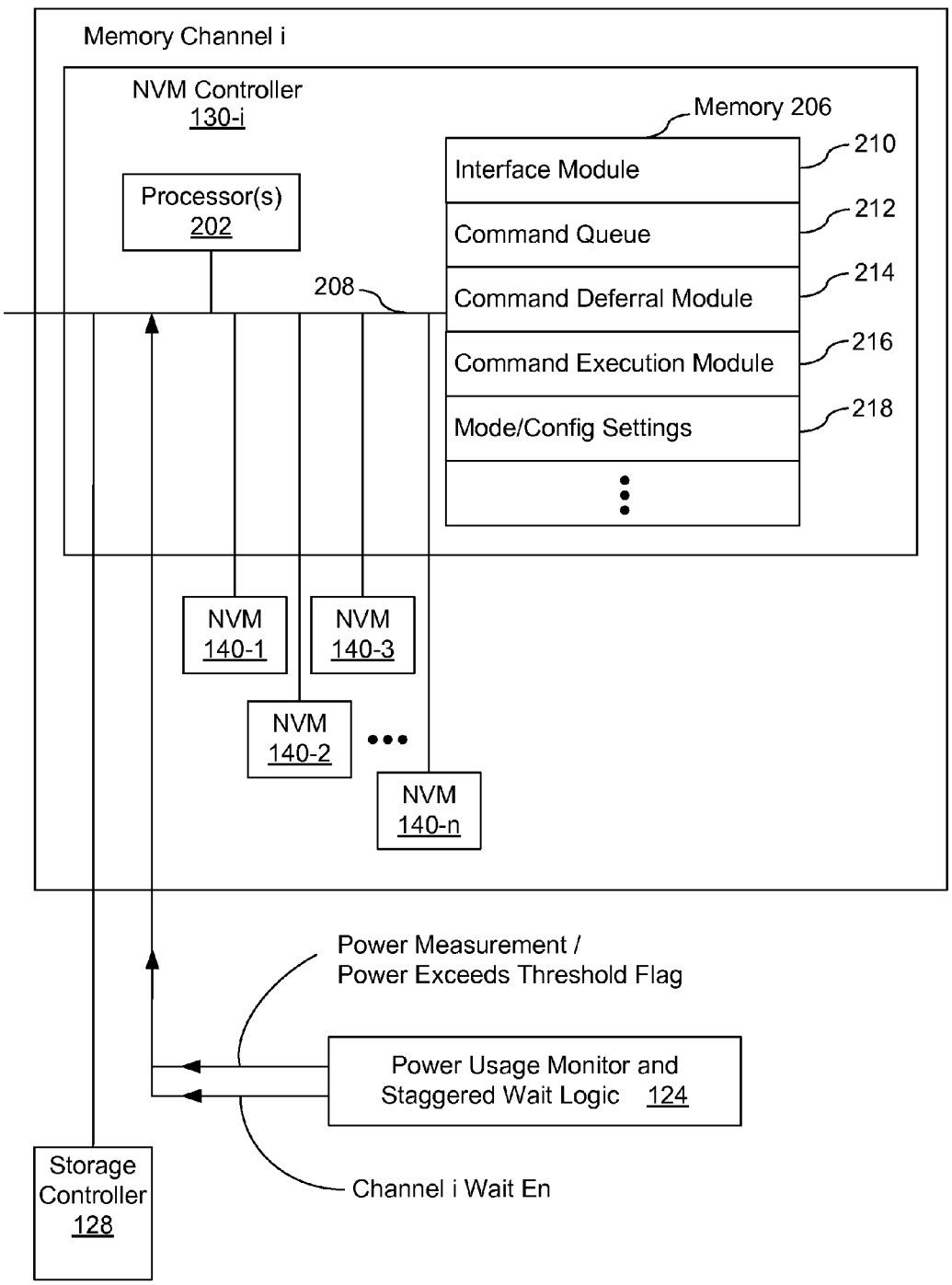
FIG. 2 is a block diagram illustrating an implementation of a memory channel, a power usage monitor, and staggered wait logic, in accordance with some embodiments.

FIG. 2 is a block diagram illustrating an implementation of a memory channel, memory channel i, and power usage monitor and staggered wait logic 124, in accordance with some embodiments. In some embodiments, memory channel i includes NVM controller 130-$i$, NVM devices 140-1 through 140-$n$, one or more processors (also sometimes called CPUs or processing units or microprocessors or microcontrollers) 202 for executing modules, programs and/or instructions stored in memory 206 and thereby performing processing operations, memory 206, and one or more communication buses 208 for interconnecting these components. However, in some other embodiments, one or more of the functions described below as being performed by processor(s) 202 are instead performed by storage controller 128.

Communication buses 208 optionally include circuitry (sometimes called a chipset) that interconnects and controls communications between system components. Power usage monitor and staggered wait logic 124 is coupled to NVM controller 130, as discussed in more detail below. 130-M Power usage monitor and staggered wait logic 124 is coupled to and provides control signals (e.g., Ch 1 Deferral Signal 308, FIG. 3A) to NVM controllers 130. The control signals are sometimes herein called external signals (from the viewpoint of the individual NVM controllers 130) or command execution deferral signals. Various embodiments of power usage monitor and staggered wait logic 124 are described below with reference to FIGS. 3A and 3B.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:
  interface module 210, which is used for handling communications with storage controller 128;
  a command queue 212 that stores commands corresponding to various operations (e.g., read, write and erase) which, when executed, operate on data held within the NVM devices 140 or 142; in some embodiments, a respective memory channel has more than one command queue 212;
  command deferral module 214, which determines whether to defer execution of commands in one or more command queues (e.g., command queue 212) in accordance with one or more signals generated by power usage monitor and staggered wait logic 124;
  command execution module 216, which dispatches commands from one or more command queues (e.g., command queue 212) to the NVM devices 140 in memory channel i for execution; command deferral module 214 determines when to suspend and when to resume operation of command execution module 216; and
  optionally, mode and/or configuration settings 218 for memory channel i; for example, in some embodiments mode and/or configuration settings 218 include a setting (e.g., a setting called "command deferral enable") that indicates whether command deferral is enabled for memory channel i; in another example, in some embodiments mode and/or configuration settings 218 include a setting (e.g., a setting called "high priority channel") that indicates whether memory channel i is a high priority memory channel, in which case command deferral is not enabled for memory channel i. In some embodiments, one or more values in mode and/or configuration settings 218 are set in accordance with commands received from host computer 110.

In some embodiments, memory 206, or the computer readable storage medium of memory 206 further stores a configuration module for configuring NVM controller 130-$i$. In some embodiments, upon power up and upon reset, the configuration module automatically sets the values of one or more configuration parameters of NVM controller 130-$i$ in accordance with the components of memory channel i (e.g., the type of non-volatile memory components in memory channel i) and/or characteristics of storage device 120 and/or data storage system 100, which includes storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing at least those portions of the methods described below with reference to FIGS. 5A-5E that are performed by or within a respective memory channel i.

Although FIG. 2 shows memory channel i, FIG. 2 is intended more as a functional description of the various features which may be present in a memory channel than as a structural schematic of the embodiments described herein. In practice, and as recognized by those of ordinary skill in the art, items shown separately could be combined and some items could be separated.

Although not shown in the Figures, in some embodiments storage controller 128 includes one or more processors (sometimes called CPUs, or micro-controllers) and memory storing one or more programs executed by the one or more processors. In some implementations, those programs, when executed by the one or more processors of storage controller 128, implement at least portions of the methods described below with reference to FIGS. 5A-5E. In some embodiments, the one or more programs executed by the one or more processors of storage controller 128, implement one or more of the functions of wait pattern generator 302 and/or channel deferral signal generator 304.

Figure 3A:
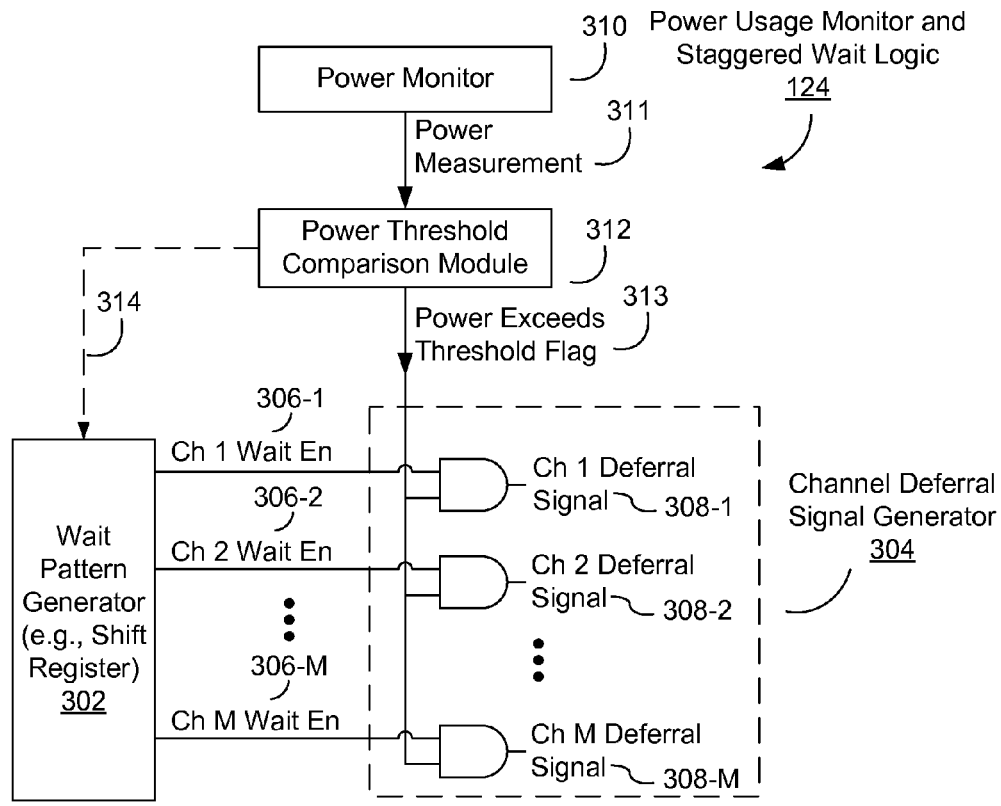
FIG. 3A is a block diagram illustrating an implementation of a power usage monitor and staggered wait logic, in accordance with some embodiments.

FIG. 3A is a block diagram illustrating an implementation of a power usage monitor and staggered wait logic 124, in accordance with some embodiments. While some example features are illustrated, various other features have not been illustrated for the sake of brevity and so as not to obscure more pertinent aspects of the example implementations disclosed herein. To that end, as a non-limiting example, power usage monitor and staggered wait logic 124 includes power monitor 310, power threshold comparison module 312, wait pattern generator 302, and optionally includes channel deferral signal generator 304. In some embodiments, externals signals are generated by channel deferral signal generator 304, each of which is sampled by command deferral module 214 (FIG. 4) of a respective memory channel to determining whether to defer execution of commands in the command queue (e.g., command queue 150) for that respective memory channel (e.g., Ch 1).

In some embodiments, power monitor 310 obtains a power measurement (e.g., power measurement 311) corresponding to power consumption by storage device 120, or a subsystem of storage device 120. Examples of the subsystem for which power is monitored are described above. Power monitor 310 is optionally implemented using one or more current sensors, current-to-voltage converters, diodes, and/or other passive or active components to measure electrical characteristics of storage device 120 and its components. Optionally, power monitor 310 is a device external to storage device 120. Furthermore, in some embodiments, power measurement 311 is a measure of instantaneous power consumption by a subsystem (e.g., the memory channels of storage device 120, including NVM controllers 130 and NVM devices 140, 142 of the memory channels). Additionally and/or alternatively, power consumption 311 is a measure of average power, equal to the total power consumption by a subsystem over a predetermined time (e.g., average power consumed per second over a 10 second period). In some implementations, power monitor 310 obtains power measurement 311 in accordance with a power measurement frequency (e.g., power measurement 311 is obtained once every 1 millisecond). In some embodiments, timing characteristics of power usage monitor and staggered wait logic 124 are configured to prevent rapid toggling between deferring and restarting execution of commands in the command queues 150/212 of the respective memory channels.

In some embodiments, power threshold comparison module 312 makes a determination to reduce power consumption (e.g., by outputting or issuing power exceeds threshold flag 313) in accordance with the obtained power measurement signal 311 and one or more power threshold values. In some embodiments, a power threshold value is a limit on instantaneous power consumption or average power consumption over a predefined period of time (e.g., a period of time having a predefined duration between 0.25 second and 10 seconds) by storage device 120 or a subsystem of storage device 120. Specifically, in some embodiments, power threshold comparison module 312 compares one or more power measurements (e.g., power measurement 311) with one or more power threshold values, and produces power exceeds threshold flag 313 if power measurement 311 exceeds a power threshold value. In some embodiments, power threshold comparison module 312 also outputs a second control signal 314 to wait pattern generator 302. In such embodiments, control signal 314 specifies a pattern of wait enable signals to be generated by wait pattern generator 302. For example, in some embodiments in which power threshold comparison module 312 compares power measurement 311 with two or more power thresholds, the second control signal 314 corresponds to the highest power threshold exceeded by power measurement 311, and the wait enable signal pattern generated by wait pattern generator 302 also corresponds to the highest power threshold exceeded by power measurement 311. In a non-limiting example, the second control signal 314 determines the duty cycle of the wait periods 320 (FIG. 3B) in the wait enable signals generated by wait pattern generator 302, and the duty cycle specified by the second control signal 314 is higher, when a higher power threshold is exceeded by power measurement 311, than when power measurement 311 exceeds only a lower power threshold.

In some implementations, power monitor 310 and power threshold comparison module 312 are implemented in host system 110, external to storage device 120, while wait pattern generator 302 is implemented in storage device 120. In such implementations, storage device 120 receives one or more control signals (sometimes herein called external signals) produced by power threshold comparison module 312, such as power exceeds threshold flag 313, and optionally second control signal 314.

Wait pattern generator 302 generates wait enable signals 306-1 to 306-M, and is coupled, in some embodiments, to one or more logic gates of channel deferral signal generator 304. Alternatively, wait pattern generator 302 is coupled to command deferral logic 152 or command deferral module 214 in each of the memory channels configured to defer execution of commands in a corresponding command queue based on one or more "external" signals received by those memory channels. In some embodiments, wait pattern generator 302 is circuitry that resides in storage controller 128. In some other embodiments, wait pattern generator 302 is implemented by a set of instructions in one or more programs executed by one or more processors of storage controller 128.

In some implementations, each of the generated wait enable signals 306 corresponds to a respective memory channel (e.g., Ch 1, Ch 2, etc.), and therefore also corresponds to the respective NVM controller 130 and NVM devices in that memory channel. Each of the wait enable signals has a predefined value (e.g., a logic 1 value) during a wait period (e.g., wait period 320, FIG. 3B). The wait period is the time during which the corresponding command deferral module 214 defers execution of commands in a corresponding command queue 150 if a determination has been made to reduce power consumption by the storage device 120 (e.g., because the power measurement 311 has been determined to exceed a power threshold). In some embodiments, command deferral during the wait period can be overridden by a command in the command queue 150 having a predefined high priority.

Figure 3B:
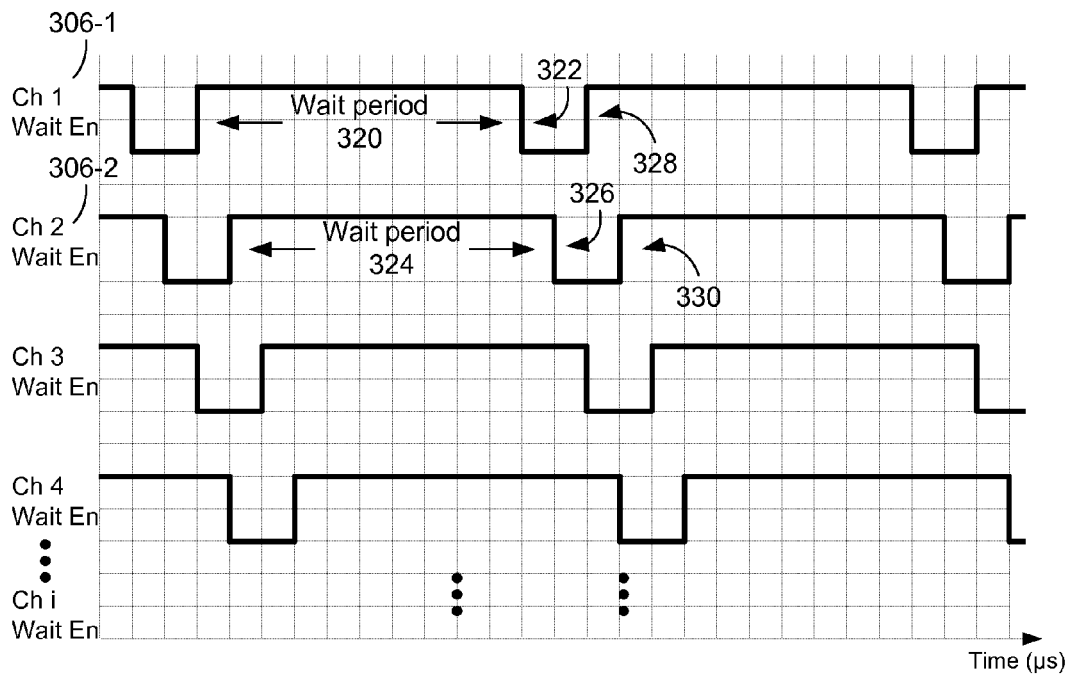
FIG. 3B is a prophetic illustration of multiple wait enable signals corresponding to multiple memory channels, in accordance with some embodiments.

In some embodiments, the wait enable signals are generated so that the memory channels of storage device 120 (e.g., Ch 1, Ch 2) have staggered start times (e.g., 322, 326). An example of this is shown in FIG. 3B. Each start time corresponds to the end of a wait period (e.g., wait period 320, 324) for the corresponding memory channel. Stated another way, the wait periods for the memory channels have staggered end times corresponding to distinct start times. Start times (e.g., start time 322) are the times at which the command deferral modules (e.g., command deferral module 214) restart execution of commands in the respective command queues (e.g., command queue 150).

In some embodiments, the respective wait period (e.g., wait period 320) for a first distinct set of NVM devices (e.g., the NVM devices in a first memory channel) is at least partially non-overlapping with the respective wait period (e.g., wait period 324) for a second distinct set of NVM devices (e.g., the NVM devices in a second memory channel). By generating wait enable signals 306 such that the respective wait periods (e.g., wait periods 320 and 324) are partially non-overlapping, execution of commands in the command queues of the different memory channels are deferred in a staggered manner and resumed in a staggered manner. As a result, power consumption is managed across multiple memory channels and power consumption spikes are reduced.

In some embodiments, each memory channel for which command execution is being deferred (of a set of two or more memory channels for which command execution is being deferred) resumes execution at a different start time than the other memory channels for which command execution is being deferred. In the example shown in FIG. 3B, the start time for memory channel 1 is different from the start time for memory channels 2, 3 and 4. In some other embodiments, two or more memory channels may have the same start time for resuming execution of commands, while at least one other memory channel has a different start time for resuming execution of commands in their respective command queues.

In some embodiments, the wait period (e.g., wait period 320) for each memory channel repeats (i.e., memory channel(s) are held in the WAIT state in a rotating fashion) in accordance with a duty cycle so that no one memory channel is in a persistent WAIT state. Furthermore, in some embodiments, the duty cycle of the wait period for each memory channel corresponds to a priority of the memory channel (e.g., a memory channel with a high priority has a wait period that repeats at a first duty cycle that is lower than the duty cycle of the wait period for another memory channel with a low priority). For example, if memory channel 1 is designated a high priority memory channel, wait period 320 (having a 10 μs duration, for example) repeats, and execution of commands in its command queue 150 is deferred for the wait period once every 50 μs, whereas the wait period 324 for memory channel 2, designated a low priority memory channel, repeats once every 20 μs. In the latter example, the wait period of memory channel 1 has a duty cycle of twenty percent while the wait period of memory channel 2 has a duty cycle of fifty percent.

In some implementations, the wait period (e.g., wait period 320) for a memory channel has a duration based at least in part on a priority of the corresponding memory channel (e.g., if memory channel is a high priority memory channel, its corresponding wait period has a shorter duration than that of the wait period of another lower priority memory channel). For example, the wait period 320 of a high priority memory channel 1 has a duration of 5 μs, whereas the wait period 324 of a normal priority memory channel 2 has a duration of 15 μs. Effectively, a longer wait period duration increases the time by which the execution of a command is deferred. In some embodiments, both the duration and the duty cycle of the wait period of a corresponding memory channel are based at least in part on the priority of the corresponding memory channel. For example, a high priority memory channel 1 has a short wait period (e.g., 5 μs) that repeats at a low duty cycle (e.g., 5 μs of every 50 μs, which is duty cycle of ten percent), while a normal priority memory channel 2 has a longer wait period (e.g., 15 μs) that repeats at a moderate duty cycle (e.g., 15 μs of every 50 μs, which is duty cycle of thirty percent), such that more commands in the command queue of memory channel 1 can be executed in succession, and the execution of such commands will be deferred for shorter periods of time, than for memory channel 2.

In some implementations, the wait period and duty cycle of a corresponding memory channel are set in accordance with the power thresholds that have been exceeded by power measurement 311, as determined by power threshold comparison module 312. For example, if there are two or more predefined power thresholds (e.g., power threshold A=3200 milliWatts, and power threshold B=3600 milliWatts), and only the lower power threshold A is exceeded by power measurement 311 (e.g., power measurement 311 is 3225 milliWatts), the wait periods and duty cycles of the wait enable signals for each memory channel are smaller than they would be if both power thresholds A and B are exceeded by power measurement 311. As a result, when both power thresholds are exceeded by power measurement 311, command execution is reduced by a greater degree (e.g., thirty percent) than when only one of the power thresholds is exceeded (e.g., ten percent).

In some embodiments, the power threshold or thresholds are determined based on the number of memory channels and the number of NVM devices per memory channel. For example, in some implementations, a power threshold of 200 milliWatts per channel is used, where the power measurement is based on power drawn only by the NVM devices, but not any of the support circuitry. In some embodiments, such as embodiments in which the power measurement is performed external to the storage device, the power threshold or thresholds are determined based on power consumption of the entire storage device. In some implementations, one of the power thresholds is based, at least in part, on the sum of the idle power consumed by the storage device (e.g., 3.0 to 3.5 Watts consumed by the controllers and other support circuitry while no memory read, write and erase operations are being performed) plus a power consumption limit per memory channel multiplied by the number of memory channels. Further, another factor used in determining one or more of the power thresholds in some implementations is a physical limit on the amount of power that a host system 110 or other system can provide to storage device 120. In some embodiments, the host system 110 has both a peak power limit and a sustained power limit on how much power can be provided to storage device 120, and one or both of these factors is taken into account in setting one or more power thresholds for the power usage monitor and staggered wait logic 124. Furthermore, in some embodiments, the one or more power thresholds are either firmware settable, or are implemented as values stored by storage controller 128 in accordance with one or more commands received from host system 110.

In some embodiments, channel deferral signal generator 304 generates one or more external signals 308 (e.g., Ch 1 Deferral Signal 308-1, Ch 2 Deferral Signal 308-2, . . . Ch M Deferral Signal 308-M) in accordance with a determination to reduce power consumption (e.g., power exceeds threshold flag 313 is produced) and one or more generated wait enable signals (e.g., Ch 1 Wait Enable 306). More specifically, in some embodiments, channel deferral signal generator 304 is implemented with one or more AND gates that produce the one or more external signals when both the wait enable signal (e.g., Ch 1 Wait En 306) is high, and the power threshold comparison module 312 has produced a power exceeds threshold flag 313 (i.e., power measurement 311 exceeds a predefined power threshold value). Thus, for example, Ch 1 Deferral Signal 308-1 is produced as an external signal for deferring execution of commands in command queue 150 (i.e., when Ch 1 Wait En 306-1 is in its wait period 320) when the power exceeds threshold flag 313 is produced. The one or more external signals are sampled by command deferral module 214 (e.g., FIG. 4 (400)), and the execution of commands in the command queues (e.g., command queue 150) of one or more memory channels (e.g., Ch 1) are deferred accordingly.

In some embodiments, the power exceeds threshold flag 313 is produced and provided directly to wait pattern generator 302, which contains logic for generating a set of channel deferral signals for deferring execution of commands, where the one or more externals signals are sampled by command deferral module 214. In these embodiments, channel deferral signal generator 304 is not needed. Furthermore, in these embodiments, the external signals for deferring execution of commands are not generated by wait pattern generator 302 if a determination has not been made to reduce power consumption by the storage device 120 (e.g., because the power measurement 311 has not been determined to exceed a power threshold).

In some implementations, some or all of power usage monitor and staggered wait logic 124 includes one or more logic gates, shift registers, clocks, flip flops, inverters, and/or other logic elements, where the foregoing elements are implemented with transistors and other active or passive electronic components.

In some implementations, channel deferral signal generator 304 is implemented in software executed by the NVM controllers 130. More specifically, in some implementations, the NVM controller 130 for a respective memory channel receives the corresponding wait enable signal from wait pattern generator 302, and also receives the power exceeds threshold flag 313, and executes instructions in one or more programs to combine those signals and thereby produce the deferral signal, or an equivalent control value, for that memory channel.

FIG. 3B is a prophetic illustration of multiple wait enable signals corresponding to multiple memory channels, in accordance with some embodiments. It is noted that the lengths of the various time periods shown in FIG. 3B are not necessarily to scale; in some implementations the lengths of the time periods and the duty cycle of the wait periods may be substantially different from what is shown in FIG. 3B.

As shown in FIG. 3B, in some embodiments, the wait enable signals 306 of multiple memory channels (e.g., Ch 1 Wait Enable 306-1, Ch 2 Wait Enable 306-2), generated by wait pattern generator 302, have staggered start times (e.g., 322, 326) corresponding to the end of a wait period (e.g., wait period 320, 324) for the corresponding memory channel. Furthermore, as illustrated in FIG. 3B, in some embodiments the respective wait period (e.g., wait period 320) for a first distinct set of NVM devices 140 in at least two distinct sets of NVM devices is at least partially non-overlapping with the respective wait period (e.g., wait period 324) for a second distinct set of NVM devices 140 in the at least two distinct sets.

Figure 4:
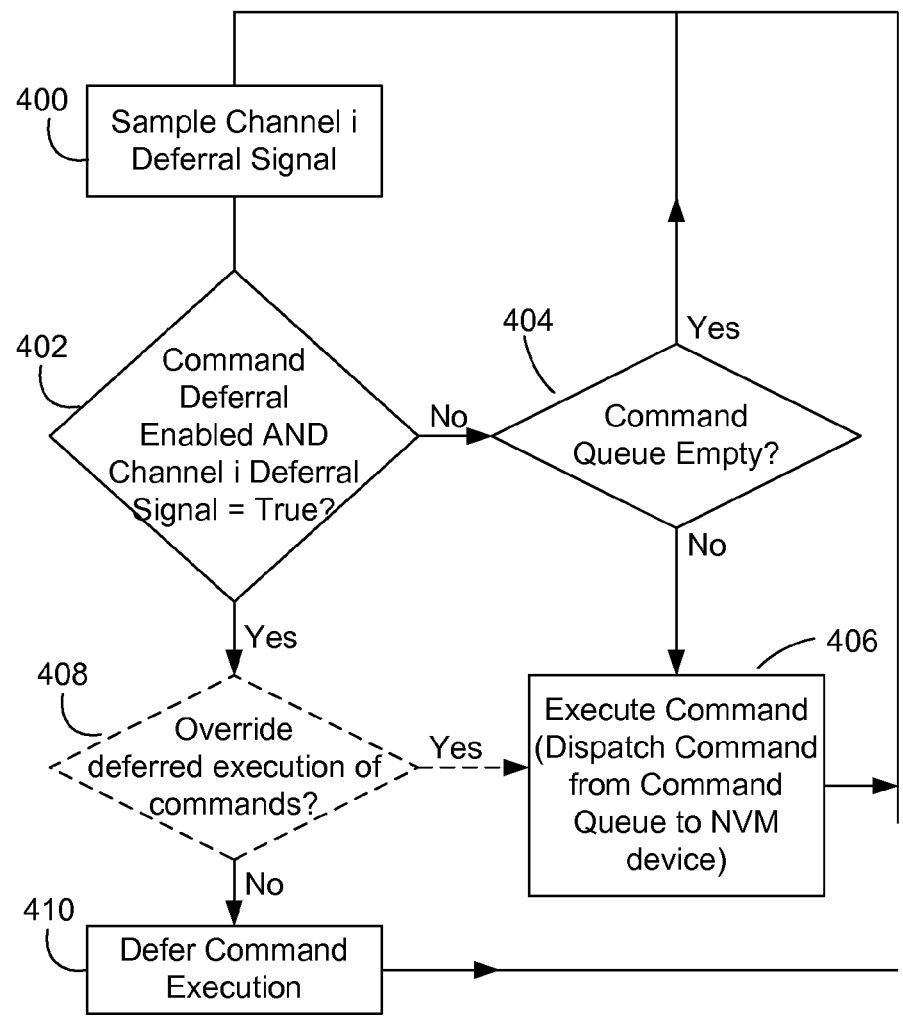
FIG. 4 is a flowchart representation illustrating the operation of a command deferral module, in accordance with some embodiments.
Figure 5C:
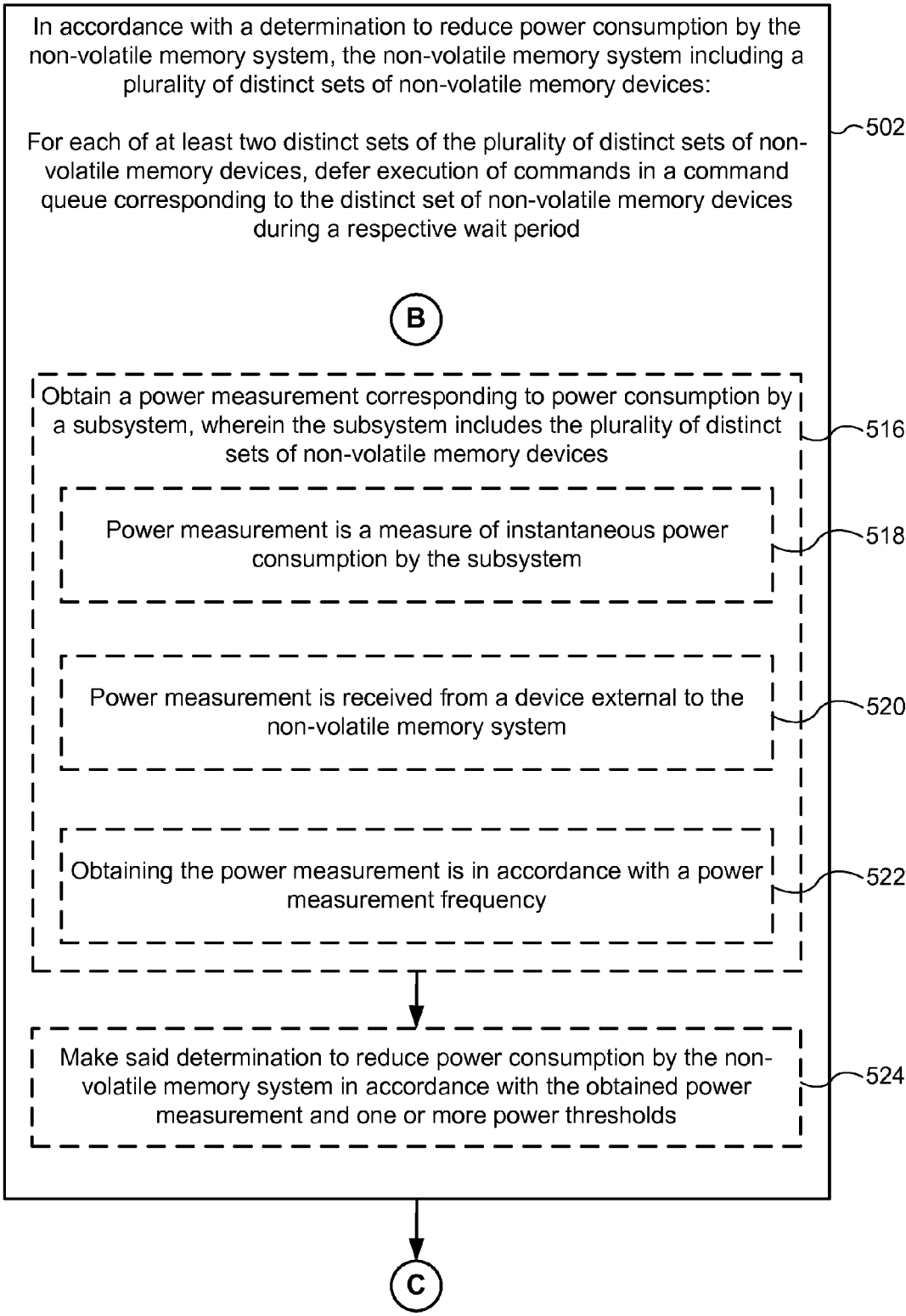
Figure 5D:
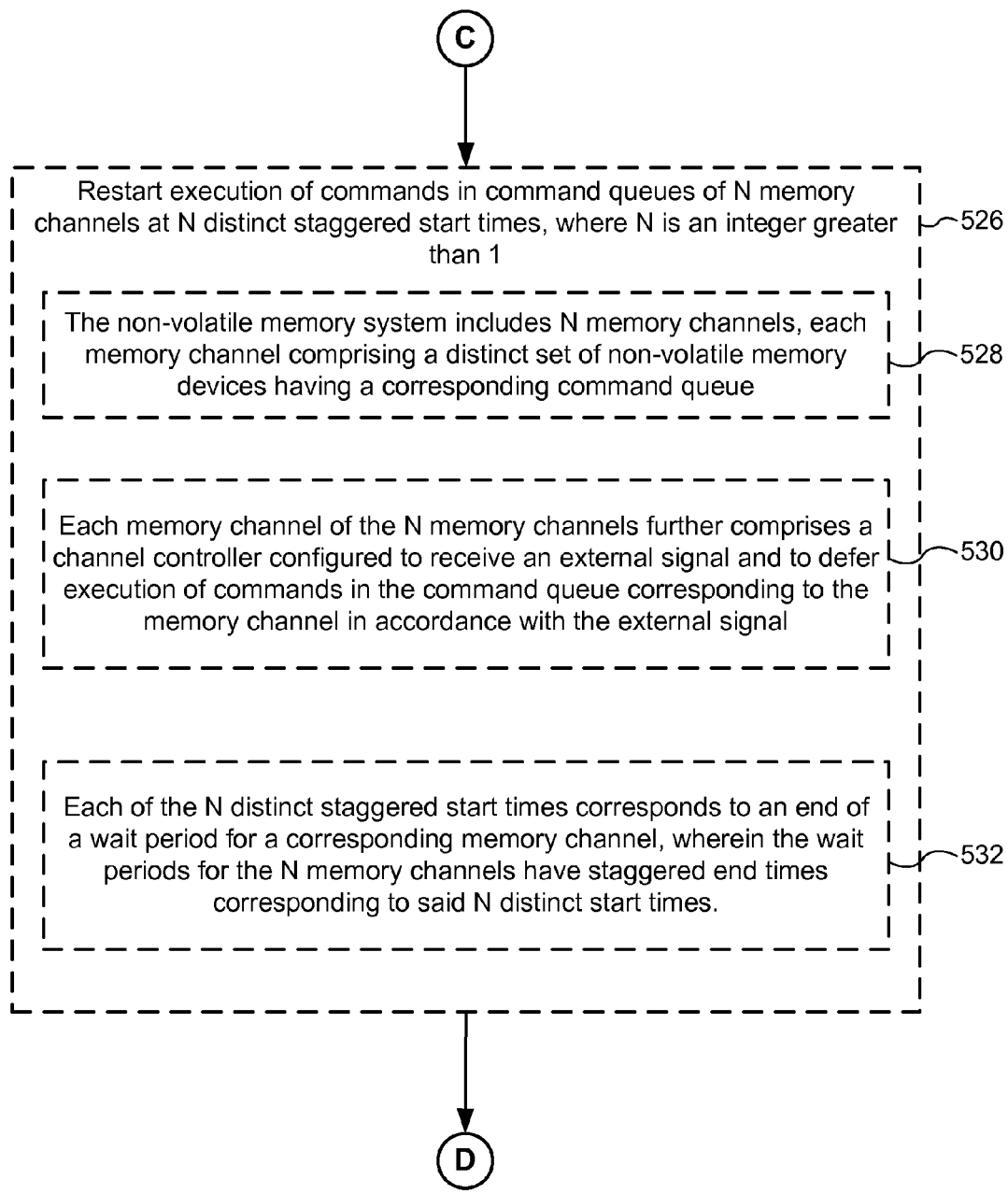
Figure 5E:
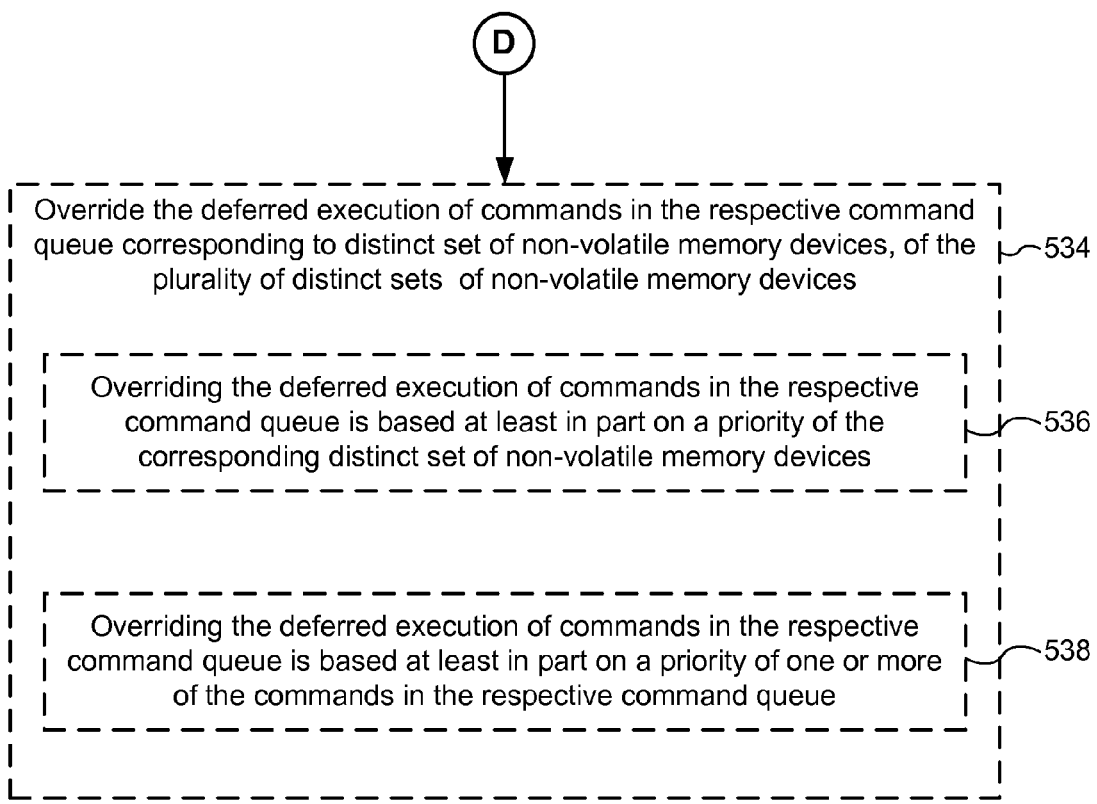

FIG. 4 is a flowchart representation illustrating the operation of a command deferral module 214 for a respective memory channel i, in accordance with some embodiments. As illustrated in FIG. 4, command deferral module 214 determines whether to defer execution of commands in a command queue (e.g., command queue 150) for the respective memory channel i (e.g., Ch 1) in accordance with one or more external signals received by the memory channel's controller.

In some embodiments, command deferral module 214 for memory channel i samples (400) the channel i deferral signal 308-i, sometimes herein called an external signal since it is provided, in some embodiments, by a channel deferral signal generator 304 (FIG. 3A) external to the memory channel. In some implementations, command deferral module 214 samples a channel deferral signal generated by wait pattern generator 302 (e.g., in implementations in which an output of power threshold comparison module 312 is received by wait pattern generator 302). As described above, in some other embodiments the channel i deferral signal 308-i sampled at 400 is generated by a program executed by the same NVM controller as the one that includes (or executes) command deferral module 214. However, in those embodiments, the channel i deferral signal 308-i is generated based on one or more external signals, such as channel i wait signal 306-i and power exceeds threshold flag 313.

Next, in some embodiments, command deferral module 214 determines (402), in accordance with the sampled channel i deferral signal 308-i, whether deferring execution of commands in the command queue 150 for memory channel i is currently enabled. In some embodiments, this determination is based solely on the state or value of the sampled channel i deferral signal 308-i (e.g., a determination of whether the sampled channel i deferral signal 308-I=TRUE), while in other embodiments this determination is based on both the state or value of the sampled channel i deferral signal 308-i and another signal or value (e.g., power exceeds threshold flag 313, or a mode setting for the memory channel or a mode setting for the entire storage device) that indicates whether the command deferral feature is enabled.

If deferring execution of commands in a respective command queue is not currently enabled (402—No), command deferral module 214 then determines (404) whether the command queue 150 for the respective memory channel is empty. If the respective command queue is empty (404—Yes), then command deferral module 214 continues to sample (400) the channel i deferral signal 308-i. On the other hand, if the respective command queue is not empty (404—No), a command in the respective command queue is executed (406) (e.g., by command executor 154, which dispatches a command from the command queue to the one or more NVM devices to which the command is directed).

If deferring execution of commands in a respective command queue is currently enabled (402—Yes), then command deferral module 214 determines (408) whether to override the deferred execution of commands in the respective command queue. In some embodiments, overriding the deferred execution of commands in a respective command queue is based at least in part on a priority (e.g., a priority setting) of the corresponding memory channel, or equivalently, priority of the distinct set of non-volatile memory devices in the corresponding memory channel. For example, if memory channel 1 is a high priority memory channel, command deferral module 214 may be configured such that commands in the command queue of memory channel 1 cannot be deferred, and must always be executed without delay. It is noted that a memory channel may be designated as a high priority memory channel if, for example, commands in its command queue involve operating on user data that is deemed critical. In some embodiments, storage device 120 is configured to designate one or more memory channels as high priority memory channels in accordance with commands (e.g., configuration setting commands) received from a host computer system 110.

In some implementations, the presence of one or more high priority instructions or commands in a command queue overrides the deferred execution of commands in that command queue. To utilize this feature, the host system 110 sends one or more high priority commands to the storage device 120, which are placed in respective command queues for one or more memory channels by the storage device 120 (e.g., by storage controller 128). In some implementations, so long as at least one high priority instruction or command is present in the respective command queue for a memory channel, any deferral of execution of command in that command queue is overridden. In some implementations, any high priority instructions or commands in a respective command queue are executed (e.g., dispatched to one or more NVM devices for execution) first, before any lower priority instructions or command in the respective command queue are executed.

In some embodiments, deferring execution of a particular command is performed in accordance with the power consumption of the command type of the particular command. For example, in some embodiments, storage device 120 consumes less power in executing a read command than in executing a write command or erase command. In this example, when a "read" command is the next command in the command queue 150 of a respective memory channel, the NVM controller 130 for that memory channel overrides the deferred execution of commands in the respective command queue, enabling the read command to be executed even though command deferral is enabled (402—Yes).

If command deferral module 214 overrides (408—Yes) the deferred execution of commands in the respective command queue, then execution of commands in the respective command queue is not deferred, and one or more commands in the respective command are executed (e.g., by command executor 154, or command execution module 216, which dispatches the command(s) to one or more NVM devices for execution). In some embodiments, a single command is executed upon the making of this determination (408—Yes), and then the process repeats starting at operation 400, to determine whether to execute a next command, if any, in the respective command queue.

On the other hand, if command deferral module 214 does not override (408—No) the one or more external signals, then execution of commands in the respective command queue is deferred (410), and command deferral module 214 repeats the process described above, starting with once again sampling (400) the channel i deferral signal.

FIGS. 5A-5E illustrate a flowchart representation of a method 500 of deferring execution of commands in the command queues of at least memory channels, in accordance with some embodiments. A non-volatile memory system (e.g., storage device 120, FIG. 1), which includes a plurality of distinct sets of non-volatile memory devices (e.g., NVM devices 140-1 through 140-n, and NVM 142-1 through 142-k), coordinates and manages multiple subsystem components to defer execution of commands in the command queue corresponding to at least two distinct sets of non-volatile memory devices.

A non-volatile memory system (e.g., storage device 120), in accordance with a determination to reduce power consumption by the non-volatile memory system, and for each of at least two distinct sets of the plurality of distinct sets of non-volatile memory devices, defers (502) execution of commands in a command queue corresponding to the distinct set of non-volatile memory devices during a respective wait period. The respective wait period for a first distinct set of non-volatile memory devices in the at least two distinct sets is at least partially non-overlapping (504) with the respective wait period for a second distinct set of non-volatile memory devices in the at least two distinct sets. In some implementations, wait pattern generator 302 generates wait enable signals 306 (e.g., Ch 1 Wait Enable 306-1, Ch 2 Wait Enable 306-2), each including a respective wait period (e.g., wait period 320, 324, FIG. 3B). Because the respective wait periods (e.g., wait periods 320 and 324) are partially non-overlapping, execution of commands in the command queue (e.g., command queue 150) are deferred in a staggered manner, and power consumption is managed across memory channels to reduce power consumption spikes.

In some embodiments, each of the plurality of distinct sets of non-volatile memory devices comprises a memory channel (506) that also includes a corresponding channel controller, and the command queue corresponding to the distinct set of non-volatile memory devices in the memory channel comprises a command queue for the memory channel.

Furthermore, in some embodiments, the channel controller for a respective memory channel (e.g., memory channel i) determines (508) whether to defer execution of commands in the command queue for the respective memory channel in accordance with an external signal received by the channel controller. In some implementations, the aforementioned external signal is the channel deferral signal 308-i described above with reference to FIG. 3A. In some implementations, the aforementioned external signal is a signal (e.g., power exceeds threshold flag 313) that indicates that a current power measurement exceeds one or more power thresholds. See also the discussion above of operations 400 and 402 of the flowchart representation illustrating the operation of a command deferral module.

In some embodiments, the non-volatile memory system (e.g., storage device 120) includes M memory channels (510), where M is an integer greater than 1, each memory channel including a distinct set of non-volatile memory devices having a corresponding command queue and wait period. In some implementations, the wait period for each memory channel of the M memory channels repeats (512) in accordance with a duty cycle corresponding to a priority of the memory channel. As a result, no one memory channel is in a persistent WAIT state. Furthermore, in some embodiments, the duty cycle corresponds to a priority of the memory channel (e.g., a memory channel with a high priority has a wait period that repeats at a low duty cycle).

In some implementations, the wait period for each memory channel of the M memory channels has a duration (514) based at least in part on a priority of the corresponding memory channel. Examples of this are discussed above with reference to FIGS. 3A and 3B. In some embodiments, both the duration and the duty cycle of the wait period (e.g., wait period 320, FIG. 3B) of a corresponding memory channel are based at least in part on the priority of the corresponding memory channel. Furthermore, in some implementations, the wait period and duty cycle of a corresponding memory channel are set in accordance with one or more power threshold values that have been exceeded, as determined by power threshold comparison module 312.

In some embodiments, a power measurement corresponding to power consumption by a subsystem is obtained (516), wherein the subsystem includes the plurality of distinct sets of non-volatile memory devices. Examples of such a subsystem are described above with reference to FIG. 1. In some implementations, the power measurement corresponding to power consumption by a subsystem is obtained by a power usage monitor such as power usage monitor and staggered wait logic 124, described above with reference to FIG. 3A.

In some implementations, the power measurement is a measure of instantaneous power consumption (518) by the subsystem. Additionally and/or alternatively, power consumption 311 is a measure of average power consumption by the subsystem, equal to the total power consumption by the subsystem over a predetermined time (e.g., average power consumed per second over a 10 second period).

Furthermore, in some implementations, the power measurement is received from a device external (520) to the non-volatile memory system. Furthermore, in some implementations, the power measurement is obtained in accordance with a power measurement frequency (522).

Further, in some embodiments, the determination to reduce power consumption by the non-volatile memory system is made (524) in accordance with the obtained power measurement and one or more power thresholds. Power threshold comparison module 312 makes the determination to reduce power consumption (e.g., power exceeds threshold flag 313) in accordance with the obtained power measurement signal 311 and one or more power thresholds (sometimes called power threshold values). In some embodiments, a power threshold is a limit on instantaneous power consumption (e.g., a limit on peak power consumption of 3200 milliWatts by the NVM devices in the storage device), and/or a limit on average power equal to the total power consumption by the subsystem over a predetermined time (e.g., a limit of 3200 milliWatts consumed per second, on average, over a 10 second period). Specifically, in some embodiments, power threshold comparison module 312 compares one or more power measurements (e.g., power measurement 311) with one or more power thresholds, and produces power exceeds threshold flag 313 if power measurement 311 exceeds a power threshold. In some implementations, power threshold comparison module 312 sets power exceeds threshold flag 313 to a first predefined value (e.g., "true" or 1) if power measurement 311 exceeds a power threshold, and sets power exceeds threshold flag 313 to a second predefined value (e.g., "false" or 0) if power measurement 311 does not exceed a power threshold.

In some embodiments, execution of commands is restarted (526) in command queues of M memory channels at M distinct, staggered start times, where M is an integer greater than 1. Furthermore, in some implementations, the non-volatile memory system includes M memory channels (528), each memory channel comprising a distinct set of non-volatile memory devices having a corresponding command queue. In some further implementations, each memory channel of the M memory channels further comprises a channel controller configured (530) to receive an external signal and to defer execution of commands in the command queue corresponding to the memory channel in accordance with the external signal. In some implementations, each of the M distinct staggered start times corresponds to an end of a wait period (532) for a corresponding memory channel, wherein the wait periods for the M memory channels have distinct, staggered end times corresponding to said M distinct start times.

Optionally, in some embodiments, the method includes overriding (534) the deferred execution of commands in the respective command queue corresponding to a distinct set of non-volatile memory devices of the plurality of distinct sets of non-volatile memory devices. In some implementations, overriding the deferred execution of commands in the respective command queue is based at least in part on a priority (536) of the corresponding distinct set of non-volatile memory devices. For example, if a respective memory channel is a high priority memory channel, command deferral module 214 for that memory channel is configured to continue executing commands in the command queue for the respective memory channel, without delay, even when the channel deferral signal 308 for the respective memory channel indicates that deferring execution of commands in the command queue 150 for the respective memory channel is enabled. Further discussion of overriding deferred execution of commands based on memory channel priority can be found above, with respect to operation 408 in FIG. 4.

Furthermore, in some implementations, overriding the deferred execution of commands in the respective command queue is based at least in part on a priority (538) of one or more of the commands in the respective command queue. Further discussion of overriding deferred execution of commands based on priority of one or more command in the respective command queue can be found above, with respect to operation 408 in FIG. 4.

In some implementations, with respect to any of the methods described above, the storage device includes (1) an interface for coupling the storage device to a host system, (2) a plurality of non-volatile memory controllers, each controller of the plurality of controllers configured to defer execution of commands in one or more command queues managed by controller, and (3) a plurality of distinct sets of non-volatile memory devices, each controlled by a corresponding one of the non-volatile memory controllers.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, (e.g., a NOR memory array). One of skill in the art will recognize that the MAND and NOR memory configurations are exemplary, and memory elements may be otherwise configured.

The semiconductor memory elements included in a single device, such as memory elements located within and/or over the same substrate (e.g., a silicon substrate) or in a single die, may be distributed in a two- or three-dimensional manner (such as a two dimensional (2D) memory array structure or a three dimensional (3D) memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration (e.g., in an x-z plane), thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned wherein some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Associated circuitry is typically required for proper operation of the memory elements and for proper communication with the memory elements. This associated circuitry may be on the same substrate as the memory array and/or on a separate substrate. As non-limiting examples, the memory devices may have driver circuitry and control circuitry used in the programming and reading of the memory elements.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions descried and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of operation in a non-volatile memory system, comprising:
   in accordance with a determination to reduce power consumption by the non-volatile memory system, the non-volatile memory system including a plurality of distinct sets of non-volatile memory devices, and the plurality of distinct sets of non-volatile memory devices including a first distinct set of non-volatile memory devices and a second distinct set of non-volatile memory devices:
      for each of at least two distinct sets of the plurality of distinct sets of non-volatile memory devices, deferring execution of commands in a command queue corresponding to the distinct set of non-volatile memory devices during a respective wait period;
   wherein:
   the non-volatile memory system determines the respective wait period for the first distinct set of non-volatile memory devices such that the respective wait period for the first distinct set of non-volatile memory devices is at least partially non-overlapping with the respective wait period for the second distinct set of non-volatile memory devices.

2. The method of claim 1, wherein each of the plurality of distinct sets of non-volatile memory devices comprises a memory channel that includes a corresponding channel controller, and the command queue corresponding to the distinct set of non-volatile memory devices in the memory channel comprises a command queue for the memory channel.

3. The method of claim 2, wherein a channel controller for a respective memory channel determines whether to defer execution of commands in the command queue for the respective memory channel in accordance with an external signal received by the channel controller.

4. The method of claim 1, wherein the non-volatile memory system includes M memory channels, each memory channel comprising a distinct set of non-volatile memory devices having a corresponding command queue, the method including:
restarting execution of commands in command queues of the M memory channels at M distinct staggered start times, where M is an integer greater than 1.

5. The method of claim 4, wherein each memory channel of the M memory channels further comprises a channel controller configured to receive an external signal and to defer execution of commands in the command queue corresponding to the memory channel in accordance with the external signal.

6. The method of claim 4, wherein each of the M distinct staggered start times corresponds to an end of a wait period for a corresponding memory channel, wherein the wait periods for the M memory channels have staggered end times corresponding to said M distinct start times.

7. The method of claim 1, wherein the non-volatile memory system includes M memory channels, where M is an integer greater than 1, each memory channel comprising a distinct set of non-volatile memory devices having a corresponding command queue and wait period, wherein the wait period for each memory channel of the M memory channels repeats in accordance with a duty cycle corresponding to a priority of the memory channel.

8. The method of claim 1, wherein the non-volatile memory system includes M memory channels, where M is an integer greater than 1, each memory channel comprising a distinct set of non-volatile memory devices having a corresponding command queue and wait period, wherein the wait period for each memory channel of the M memory channels has a duration based at least in part on a priority of the corresponding memory channel.

9. The method of claim 1, including:
   obtaining a power measurement corresponding to power consumption by a subsystem, wherein the subsystem includes the plurality of distinct sets of non-volatile memory devices; and
   making said determination to reduce power consumption by the non-volatile memory system in accordance with the obtained power measurement and one or more power thresholds.

10. The method of claim 9, wherein the obtained power measurement is a measure of instantaneous power consumption by the subsystem.

11. The method of claim 9, wherein obtaining the power measurement is in accordance with a power measurement frequency.

12. The method of claim 9, wherein the power measurement is received from a device external to the non-volatile memory system.

13. The method of claim 1, including, overriding the deferred execution of commands in a respective command queue corresponding to a distinct set of non-volatile memory devices of the plurality of distinct sets of non-volatile memory devices.

14. The method of claim 13, wherein overriding the deferred execution of commands in the respective command queue is based at least in part on a priority of the corresponding distinct set of non-volatile memory devices.

15. The method of claim 13, wherein overriding the deferred execution of commands in the respective command queue is based at least in part on a priority of one or more of the commands in the respective command queue.

16. A memory system, comprising:
   a plurality of distinct sets of non-volatile memory devices, the plurality of distinct sets of non-volatile memory devices including a first distinct set of non-volatile memory devices and a second distinct set of non-volatile memory devices;

execution deferral means, for each of at least two distinct sets of the plurality of distinct sets of non-volatile memory devices, for deferring execution of commands in a command queue corresponding to the distinct set of non-volatile memory devices during a respective wait period;

means for enabling the execution deferral means, for each of at least two distinct sets of the plurality of distinct sets of non-volatile memory devices, in accordance with a determination to reduce power consumption by the memory system; and means for determining the wait period for each of the plurality of distinct sets of non-volatile memory devices in accordance with a requirement that the respective wait period for the first distinct set of non-volatile memory devices is at least partially non-overlapping with the respective wait period for the second distinct set of non-volatile memory devices.

17. A memory system, comprising:

a plurality of distinct sets of non-volatile memory devices, the plurality of distinct sets of non-volatile memory devices including a first distinct set of non-volatile memory devices and a second distinct set of non-volatile memory devices;

a plurality of channel controllers, each channel controller corresponding to a respective set of the plurality of distinct sets of non-volatile memory devices, each channel controller configured to defer execution of commands in a command queue corresponding to the distinct set of non-volatile memory devices during a respective wait period; and an apparatus of the memory system configured to determine the wait period for each of the plurality of distinct sets of non-volatile memory devices in accordance with a requirement that, the respective wait period for the first distinct set of non-volatile memory devices is at least partially non-overlapping with the respective wait period for the second distinct set of non-volatile memory devices.

18. The memory system of claim 17, wherein each of the plurality of distinct sets of non-volatile memory devices comprises a memory channel that includes a corresponding channel controller, and the command queue corresponding to the distinct set of non-volatile memory devices in the memory channel comprises a command queue for the memory channel.

19. The memory system of claim 18, wherein a channel controller for a respective memory channel is configured to defer execution of commands in the command queue for the respective memory channel in accordance with an external signal received by the channel controller.

20. The memory system of claim 17, wherein the memory system includes M memory channels, each memory channel comprising a distinct set of non-volatile memory devices having a corresponding command queue, and the apparatus for determining the wait period for each of the plurality of distinct sets of non-volatile memory devices is configured to restart execution of commands in command queues of the M memory channels at M distinct staggered start times, where M is an integer greater than 1.

21. The memory system of claim 20, wherein each memory channel of the M memory channels further comprises a channel controller configured to receive an external signal and to defer execution of commands in the command queue corresponding to the memory channel in accordance with the external signal.

* * * * *